Figure 1:
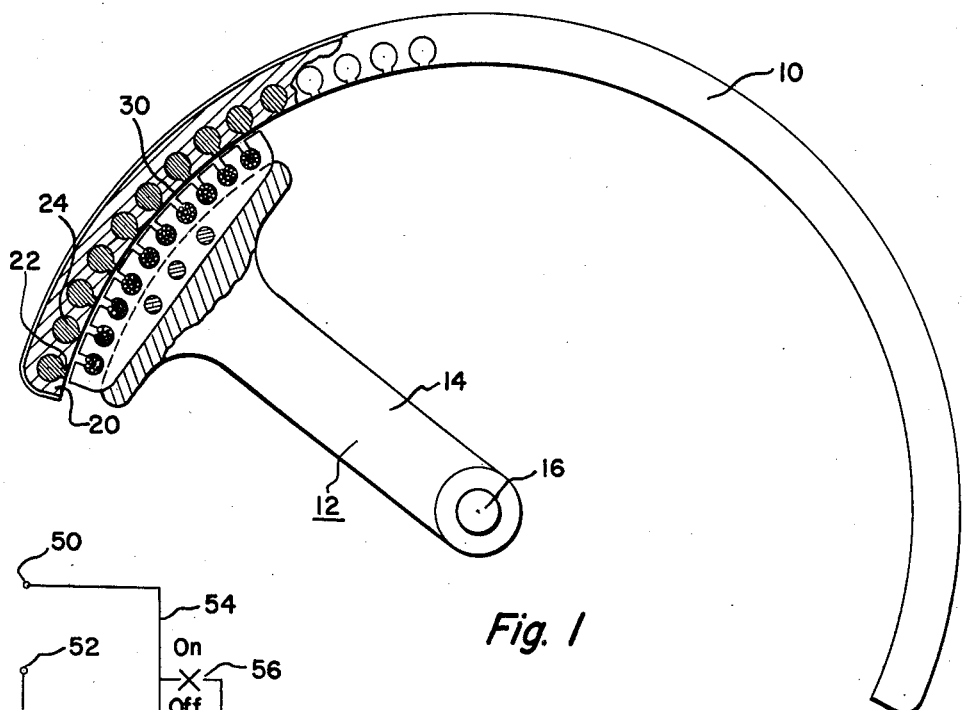

Dec. 25, 1962    E. R. ZIEGLER    3,070,733
WINDSHIELD WIPER MOTORS
Filed Oct. 29, 1958    3 Sheets-Sheet 1

INVENTOR.
Eugene R. Ziegler
BY
W. E. Finster
His Attorney

Dec. 25, 1962  E. R. ZIEGLER  3,070,733
WINDSHIELD WIPER MOTORS
Filed Oct. 29, 1958  3 Sheets-Sheet 2

INVENTOR.
Eugene R. Ziegler
BY
*W. E. Finke*
His Attorney

United States Patent Office 3,070,733
Patented Dec. 25, 1962

3,070,733
WINDSHIELD WIPER MOTORS
Eugene R. Ziegler, Spencerport, N.Y., assignor to General Motors Corporation, Detroit, Mich., a corporation of Delaware
Filed Oct. 29, 1958, Ser. No. 770,357
10 Claims. (Cl. 318—135)

This invention pertains to the art of windshield cleaning and particularly to an improved windshield wiper motor.

At the present time, it appears possible that in the near future the majority of motor vehicles will be equipped with an alternator rather than a direct current generator. Accordingly, the windshield wipers could be driven by an alternating current motor at a speed proportional to the frequency of the alternating current developed by the alternator. The present invention relates to a variable frequency alternating current motor of the strip type which is particularly adapted for actuating an oscillatory windshield cleaner comprising a blade and arm. Accordingly, among my objects are the provision of means for operating a windshield wiper from an alternating current source; the further provision of an oscillatory alternating current motor; the further provision of an oscillatory alternating current motor of the strip type particularly designed for actuating windshield wipers; and the still further provision of an alternating current windshield wiper motor including means for moving the rotor member outside of the normal stroke to a parked position.

The aforementioned and other objects are accomplished in the present invention by utilizing a two-section rotor, the salient poles of the sections being 180 electrical degrees apart. Specifically, the wiper motor includes a generally arcuate stator of the squirrel cage type comprising a plurality of laminations having pole formations and slots. The stator laminations are held in assembled relation by aluminum which is cast in place and fills the slots as well as constituting the end laminations. The rotor comprises an aluminum paddle which is drivingly connected with a shaft, the axis of the shaft being coaxial with the axis of the arcuate stator. The face of the rotor comprises two sets of laminations which are 180 electrical degrees apart. The salient poles on the rotor are formed by the laminations, and each rotor section includes conventional windings. The windings on the rotor are such that alternate poles will be magnetically energized north and south, and one section of the rotor windings is energized through a capacitor so as to be 90 electrical degrees out of phase with the other section.

The stator is formed with forty-five salient poles spaced substantially four degrees apart. Each rotor section is formed with ten salient poles spaced substantially 3.6° apart. In addition, the rotor actuates a conventional double pole, double throw reversing switch adjacent the normal stroke ends of its oscillatory movement, the reversing switch controlling the energization of the rotor windings. Accordingly, when the manual control switch is closed, the rotor will oscillate between its normal stroke limits, and to interrupt operation of the rotor the energizing circuit includes a parking switch. The parking switch may be of the cyclically operated type and thus is actuated adjacent one stroke end of the rotor during oscillation thereof. When the manual switch is opened, the parking switch will control energization of the rotor until the wiper motor reaches the inboard stroke end position, at which time the motor will be de-energized and the rotor will coast to a depressed parked position.

The wiper motor of the present invention can be used to actuate a pair of oscillatory wiper blades for either symmetrical or asymmetrical oscillation through any suitable drive means, and can also be used in a system where each wiper arm and blade assembly is actuated by its own motor. In the latter case a single manually operable switch can be used to control a plurality of motors.

Further objects and advantages of the present invention will be apparent from the following description, reference being had to the accompanying drawings, wherein preferred embodiments of the present invention are clearly shown.

Figure 3:
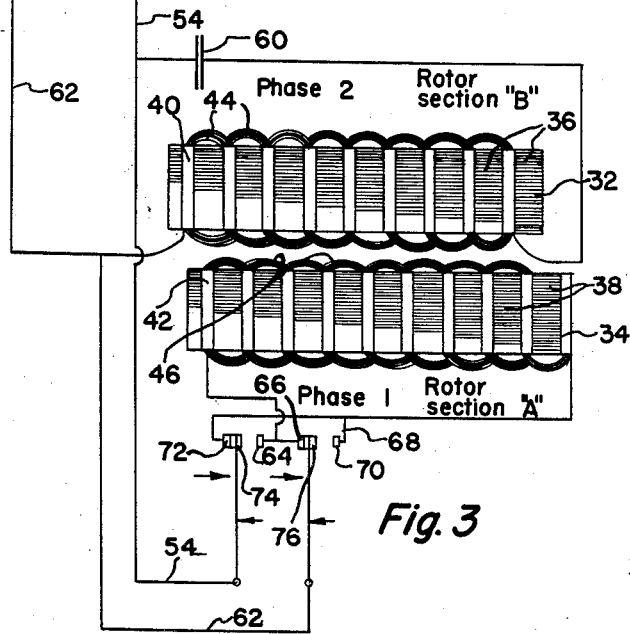
Figure 2:
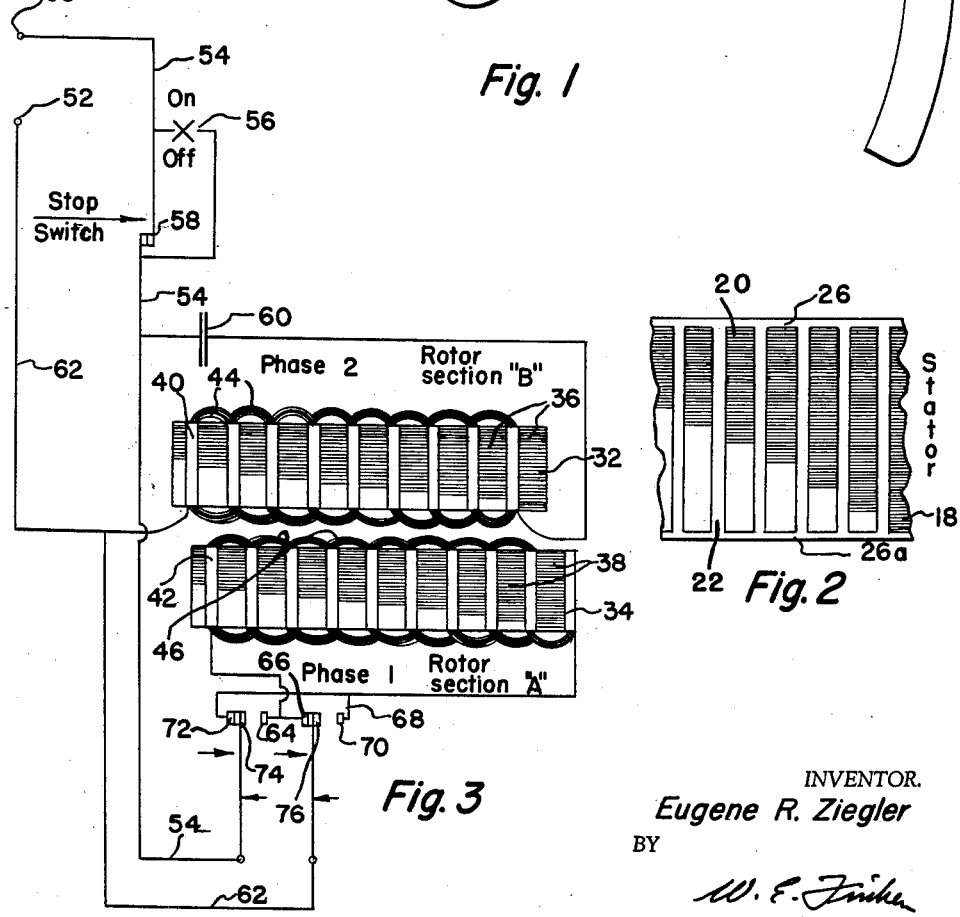
Figure 4:
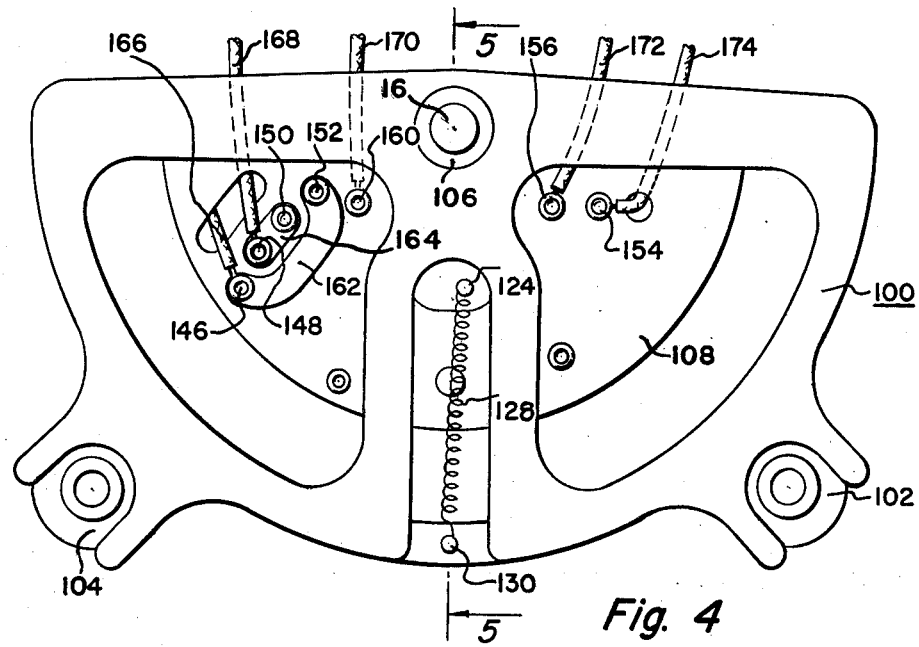
Figure 5:
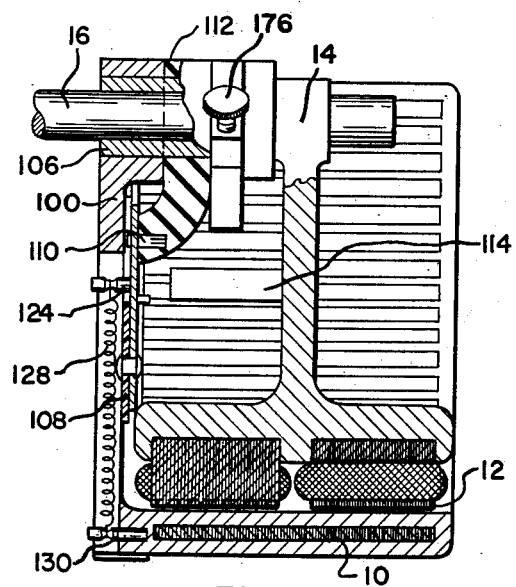
Figure 6:
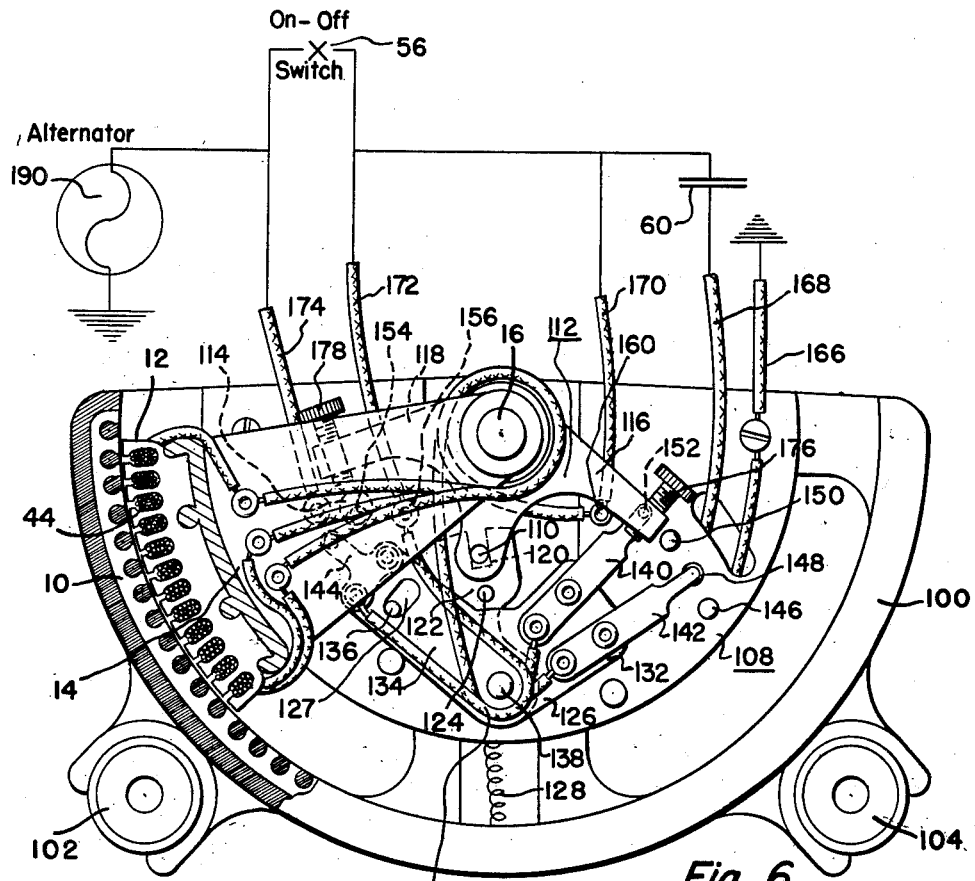
Figure 7:
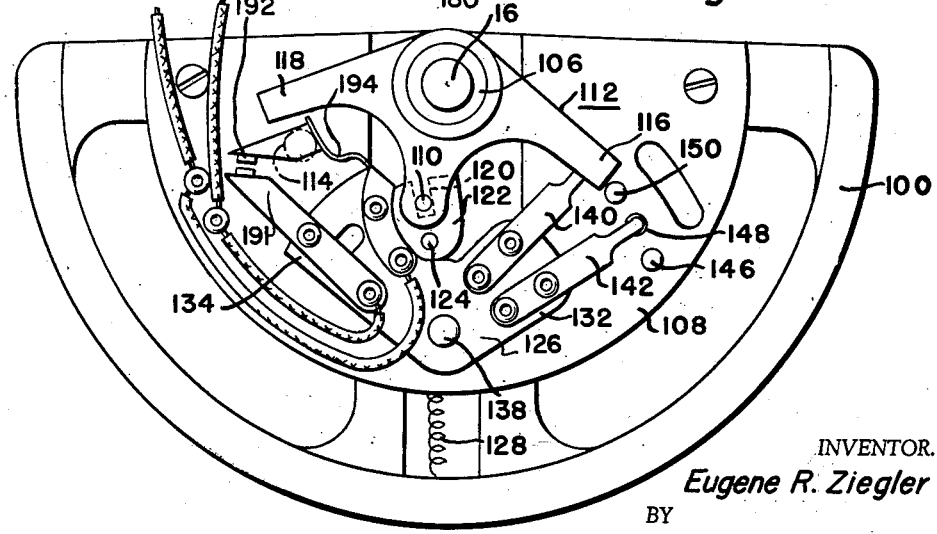

In the drawings:
FIGURE 1 is a schematic view, partly in section and partly in elevation of a motor constructed according to the present invention.
FIGURE 2 is a fragmentary view, in elevation, illustrating the stator construction.
FIGURE 3 is a schematic view of the rotor construction and energizing circuit.
FIGURE 4 is a rear side view in elevation of a structural embodiment of a motor constructed according to this invention.
FIGURE 5 is a sectional view taken along line 5—5 of FIGURE 4.
FIGURE 6 is a front side view, partly in section and partly in elevation of the motor.
FIGURE 7 is a front side view, with the rotor removed illustrating a modified switch mechanism.

With reference to FIGURE 1 a windshield wiper motor is shown comprising an arcuate stator 10 and a rotor 12. The rotor is of the paddle type comprising an aluminum arm 14 drivingly connected to a shaft 16, the axis of which coincides with the axis of the arcuate stator 10.

As seen particularly in FIGURE 2, the stator comprises a plurality of steel laminations 18, each lamination having forty-five salient poles 20 spaced 4° apart. The salient poles 20 are formed by axially extending slots 22. The plurality of stacked laminations constituting the stator is held in assembled relation by a cast in place aluminum core 24 which fills the slots 22 and also constitutes the end laminations 26 and 26a so as to form a squirrel cage stator.

As seen particularly in FIGURES 1 and 3, the rotor core is suitably secured to the outer end of the paddle 14 and is of generally arcuate configuration so as to form an arcuate air gap 30 therebetween. The rotor core comprises two sets of steel laminations 32 and 34, which are retained in assembled relation by any suitable means, not shown. The laminations 32 have a plurality of salient poles 36 spaced 3.6° apart, and the laminations 34 likewise have an equal number of salient poles 38 spaced 3.6° apart. The salient poles in the rotor sections 32 and 34 are formed by slots 40 and 42, respectively which receive windings 44 and 46, respectively. The rotor windings 44 and 46 are arranged so that adjacent poles are magnetically North and South, respectively. In order to reduce the size of the rotor, the rotor portion constituted by the laminations 32 is mechanically offset with respect to the rotor laminations 34 to a distance equivalent to 180 electrical degrees, in other words, one-half of the distance between the salient poles.

Assuming that the alternator driven by the engine develops a signal having a frequency related to car speed and wiping cycles as set forth in the following table, the motor of the present invention is designed to provide, approximately, one complete wiping cycle per second at a road speed of 40 miles per hour.

| Road Speed, m.p.h. | Frequency, cycles | Complete Wiping Cycles/ Minute |
| --- | --- | --- |
| 20 | 30 | 30 |
| 30 | 40 | 40 |
| 40 | 60 | 60 |
| 60 | 90 | 90 |
| 80 | 120 | 120 |

Theoretically, if there were no losses, the wiping cycles per minute would be double the above. However, strip motors never attain synchronous speed and considerable time will be lost in the instant motor due to the continual reversals of direction which take time to stop and likewise, time to start.

The relation between speed, frequency and number of poles is given by the equation $$N = \frac{f \times 60}{p}$$

wherein N is the speed in wiping cycles per minute, $f$ is the frequency in cycles per second and $p$ is the number of poles. The reversing switch is adjusted so that the rotor will travel 30 North or 30 South poles for each stroke—two strokes comprising the wiping cycle. Assuming that it is desired to have one complete wiping cycle per second, the foregoing table indicates that the frequency of the alternating current at forty miles an hour will be sixty cycles per second. Hence, the motor will be operating at a speed of 60 alternations per minute, and thus the rotor must traverse a distance equivalent to sixty alternate poles on the stator to obtain the desired wiping speed.

In order to maintain the size of the motor within reasonable limits, the rotor is formed with the offset sections 32 and 34 as aforedescribed. In order to reverse the direction of movement of the paddle adjacent the stroke ends, a suitable double throw, double pole reversing switch is operated by the paddle 14. With reference to FIGURE 3, the energizing circuit for the motor includes input terminals 50 and 52 which are connected to the output of the alternator, not shown. Terminal 50 is connected to a wire 54 having a manually operable on-off switch 56 and a parking switch 58 is connected in shunt therewith. The wire 54 is connected to one side of a condenser 60, the other side of which is connected to one terminal of the rotor windings 44. The other terminal of the rotor windings 44 is connected by wire 62 to the terminal 52. One terminal of the rotor windings 46 is connected to stationary contacts 64 and 66 and a double pole, double throw reversing switch 68. The other terminal of the windings 46 is connected to stationary contacts 70 and 72 of the reversing switch. The reversing switch also includes movable contacts 74 and 76, which are connected to wires 54 and 62, respectively. The condenser 60 is utilized to shift the phase of the energizing current for the rotor section 32 so that the current in the windings 44 is 90 electrical degrees out of phase with the current in windings 46. Thus, the motor operates as a two-phase motor from the single phase alternating current source.

The parking switch 58 may be cyclically operated by the paddle 14 adjacent the inboard stroke end, such that when the manual switch 56 is closed, the paddle 14 will be oscillated at a speed determined by the frequency of the alternating current source. When the manual switch 56 is opened, the parking switch 58 controls the energization of the motor so that when the paddle 14 arrives at the inboard stroke end position, and before the operation of the reversing switch, the switch 58 will be opened. At this time the motor will be de-energized and coasting motor inertia will carry the paddle 14 and the wiper arm and blade driven thereby to the parked position outside of the normal wiping range.

With particular reference to FIGURES 4 through 6, a structural embodiment of a wiper motor constructed according to the present invention will be described. The arcuate stator 10 is integral with a substantially arcuate housing 100 having a pair of integral mounting flanges 102 and 104 as shown in FIGURE 4. A bearing 106 press fitted into the housing 100 rotatably supports the oscillatory output shaft 16 to which the paddle, or vane, 14 carrying the rotor 12 is attached. A switch plate 108 of suitable insulating material is suitably mounted within the housing 100. The paddle 14 has an axially extending pin 114 attached thereto for operating the reversing switch to be described. A switch actuator 112 of insulating material, such as phenolic, is rotatably supported on the outer periphery of the bearing 106, the actuator having a center projection to which a pin 110 is attached. As seen in FIGURE 6, the switch actuator 112 is formed with a pair of arms 116 and 118, and the pin 110 is disposed within a slot 120 of a trigger member 122. The trigger member 122 carries a pin 124. One end of an overcenter toggle spring 128 is attached to the pin 124, the other end being attached to a pin 130 supported by the housing 100. The contact carrier 126 has a pair of arms 132 and 134. The toggle member 122 is pivotally suported by a pin 138 in the switch plate 108. The contact carrier 126 is pivotally supported by the pin 138 in the switch plate 108. A stationary pin 136 extends through an elongated slot 127 in the carrier 126 thereby constituting a stop limiting pivotal movement of the carrier.

The arm 132 of the carrier 126 supports leaf spring contacts 140 and 142 while the arm 134 supports switch contact 144. The switch plate 108 supports stationary contacts 146, 148, 150, 152 and 154 and terminals 156 and 160. As seen in FIGURE 4, contacts 146 and 152 are interconnected by a terminal strap 162 and contacts 148 and 150 are interconnected by terminal strap 164. The terminal strap 162 is connected to wire 166 which is connected to ground, and the terminal strap 164 is connected to wire 168. The terminal 160 is connected to wire 170. The terminal 156 is connected to wire 172 and the switch contact 154 is connected to wire 174.

The arms 116 and 118 of the actuator 112 carry adjusting screws 176 and 178, respectively, which are engaged by the pin 114. The contacts 144 and 154 constitute the parking switch, whereas contacts 146, 148, 150 and 152 together with movable contacts 140 and 142 constitute a double pole, double throw reversing switch. Terminal 156 is connected by wire 180 to the movable switch contact 144 of the parking switch, and thus it is seen that the parking switch is connected in shunt relation with the manual on-off switch designated by numeral 56. Wire 170 is connected with the windings 44 of the rotor, the other end of the windings being connected to ground. The windings 46 of the rotor are connected to movable switch contacts 140 and 142 of the double pole, double throw reversing switch.

Operation of the wiper motor is as follows. Upon closure of the manual switch 56 alternating current will be supplied from the alternator 190 to the rotor windings 44 and 46. The rotor is shown in the parked position in FIGURE 6, at which time the parking switch comprising contacts 144 and 154 is open, and movable contacts 140 and 142 engage stationary contacts 152 and 148, respectively. Therefore, the paddle 14 will oscillate in the counterclockwise direction as viewed in FIGURE 6 and when the pin 114 engages the adjusting screw 176, the trigger member 122 will be moved over the center of the spring 128, at which time the spring 128 will impart snap action movement to the trigger member and to the contact carrier 126 through the pin 124. Thus, the contact carrier 126 will move in the clockwise direction so that contact 140 will engage contact 150 and contact 142 will engage contact 146. In addition the parking switch will be closed. This will reverse the energization of the windings 46 of the rotor and thus the rotor 12 and the paddle 14 to move in the clockwise direction. When the paddle 14 approaches its other stroke end limit, the pin 114 will engage the adjusting screw 178 so as to reverse the position of the double pole, double throw switch and open the parking switch. Thus, the paddle will continue to oscillate at a frequency proportional to the frequency of the alternating current produced by the alternator 190 as long as the manual switch 56 is closed. The parking switch comprising contacts 144 and 154 is cyclically actuated adjacent the inboard stroke end since it is carried by the reversing switch carrier 126. Thus, if the manual switch 56 is opened when the paddle is moving in the clockwise direction, the motor will be de-energized when the parking switch is open, and the rotor will move beyond its normal stroke end position to a parked position due to coasting inertia.

With reference to FIGURE 7, a modified structural embodiment of the motor is shown including a different type of parking switch. The parking switch shown in FIGURE 7 comprises a contact 192 supported by a leaf spring 194, and a contact 196 carried by the contact carrier 126. In the embodiment of FIGURE 7, the pin 114 engages the arms 116 and 118 rather than the adjusting screws, which are eliminated in this embodiment. The parking switch comprising contacts 192 and 196 is opened by the pin 114 adjacent the inboard stroke end position of the rotor, irrespective of whether or not the double pole, double throw switch has been actuated. Thus, in the embodiment of FIGURE 7, the manual switch can be opened at any time irrespective of the movement of the rotor since as soon as the rotor approaches the inboard stroke end position the parking switch will be opened and the rotor will move to a depressed parked position due to its coasting inertia.

While the embodiments of the invention as herein disclosed constitutes preferred forms, it is to be understood that other forms might be adopted.

What is claimed is as follows:

1. A windshield cleaner motor including, an oscillatory member, electromagnetic means for effecting oscillatory movement thereof throughout the predetermined angle, switch means operated by said member controlling the energization of said electromagnetic means, and a parking switch operated by said member adjacent one stroke end thereof for controlling the de-energization of said electromagnetic means, said member having sufficient inertia after de-energization of said electromagnetic means to move beyond said stroke end position to a parked position by coasting inertia.

2. A windshield wiper motor including, an arcuate housing, an oscillatory member disposed within said housing, electromagnetic means for effecting oscillatory movement of said member throughout a stroke of predetermined amplitude, automatically operable reversing switch means for controlling the energization of said electromagnetic means, and a parking switch operated by said member adjacent one stroke end for controlling the de-energization of said electromagnetic means, said member being movable by coasting inertia beyond said one stroke end position to a parked position.

3. An alternating current wiper motor comprising an arcuate starter of the squirrel cage type having a plurality of salient poles, an oscillatory member supported within said stator and carrying an arcuate rotor having a plurality of salient poles spaced apart a lesser distance than the salient poles on said stator, said rotor including two pole sections, the salient poles of one section being offset relative to the salient poles of the other section, split phase windings carried by said rotor, and means for energizing said windings to effect movement of said member due to electromagnetic attraction between the stator poles and the rotor poles.

4. The motor set forth in claim 3 wherein the salient poles of one section are offset 180 electrical degrees from the salient poles of the other section.

5. The motor set forth in claim 3 wherein the rotor traverses thirty salient poles of the stator during each stroke.

6. The motor set forth in claim 3 including reversing switch means for controlling the energization of one of said split phase windings on the rotor.

7. The motor set forth in claim 6 including a reactor for shifting the phase of the alternating current in the other split phase winding.

8. The motor set forth in claim 3 including reversing switch means for controlling the energization of one winding of said split phase windings, and a parking switch for controlling the automatic de-energization of both windings.

9. A windshield wiper motor including, an arcuate housing, an oscillatory member disposed in said housing, electromagnetic means for effecting oscillatory movement of said member, reversing switch means controlling the energization of said electromagnetic means, a parking switch for controlling the de-energization of said electromagnetic means adjacent one stroke end of said member, and a switch actuator operated by said member adjacent the stroke end positions thereof and having a resilient connection with said reversing switch means for effecting snap action movement thereof, said switch actuator also operating said parking switch.

10. A windshield wiper motor including, an arcuate housing, an oscillator member disposed in said housing, electromagnetic means for effecting oscillatory movement of said member, reversing switch means controlling the energization of said electromagnetic means, a parking switch for controlling the de-energization of said electromagnetic means adjacent one stroke end of said member, and a switch actuator operated by said member adjacent the stroke end positions thereof and having a resilient connection with said reversing switch means for effecting snap action movement thereof, said parking switch being operated directly by said member.

References Cited in the file of this patent

UNITED STATES PATENTS

| 680,797 | Mershon | Aug. 20, 1901 |
| 1,929,990 | Rose | Oct. 10, 1933 |
| 1,990,566 | Ramsden | Feb. 12, 1935 |
| 2,439,951 | Schaelchlin | Apr. 20, 1948 |
| 2,491,697 | Vischulis | Dec. 20, 1949 |
| 2,629,075 | Deschmann | Feb. 17, 1953 |
| 2,831,131 | Klotz | Apr. 15, 1958 |

FOREIGN PATENTS

| 1,040,090 | France | May 20, 1953 |